(12) United States Patent
Natanzon et al.

(10) Patent No.: US 9,678,680 B1
(45) Date of Patent: Jun. 13, 2017

(54) FORMING A PROTECTION DOMAIN IN A STORAGE ARCHITECTURE

(71) Applicant: EMC Corporation, Hopkinton, MA (US)

(72) Inventors: Assaf Natanzon, Tel Aviv (IL); Erez Webman, Petach Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 100 days.

(21) Appl. No.: 14/672,640

(22) Filed: Mar. 30, 2015

(51) Int. Cl.
  G06F 12/00 (2006.01)
  G06F 13/00 (2006.01)
  G06F 13/28 (2006.01)
  G06F 3/06 (2006.01)

(52) U.S. Cl.
  CPC .......... *G06F 3/0619* (2013.01); *G06F 3/0665* (2013.01); *G06F 3/0689* (2013.01)

(58) Field of Classification Search
  CPC .......... G06F 17/30; G06F 3/06; G06F 3/0613; G06F 3/064; G06F 3/0667; G06F 3/067; G06F 3/0688
  USPC ........................................................ 711/114
  See application file for complete search history.

(56) References Cited

U.S. PATENT DOCUMENTS

| 5,170,480 | A | 12/1992 | Mohan et al. |
| 5,249,053 | A | 9/1993 | Jain |
| 5,388,254 | A | 2/1995 | Betz et al. |
| 5,499,367 | A | 3/1996 | Bamford et al. |
| 5,526,397 | A | 6/1996 | Lohman |
| 5,819,104 | A | * 10/1998 | Tuccio ................ G06F 13/4045 178/71.1 |
| 5,864,837 | A | 1/1999 | Maimone |

(Continued)

FOREIGN PATENT DOCUMENTS

| EP | 1154356 | 11/2001 |
| WO | WO 00 45581 A3 | 8/2000 |

OTHER PUBLICATIONS

Gibson, "Five Point Plan Lies at the Heart of Compression Technology;" Apr. 29, 1991; 1 Page.

(Continued)

*Primary Examiner* — Sheng-Jen Tsai
(74) *Attorney, Agent, or Firm* — Daly, Crowley, Mofford & Durkee, LLP

(57) ABSTRACT

In one aspect, a method includes generating a plurality of protection domains of software-defined storage, generating a volume in each protection domain and exposing the volumes as devices in a storage architecture which generates a RAID protection over the exposed volumes. In another aspect, an apparatus includes electronic hardware circuitry configured to generate a plurality of protection domains of software-defined storage, generate a volume in each protection domain and expose the volumes as devices in a storage architecture which generates a RAID protection over the exposed volumes. In a further aspect, an article includes a non-transitory computer-readable medium that stores computer-executable instructions. The instructions cause a machine to generate a plurality of protection domains of software-defined storage, generate a volume in each protection domain and expose the volumes as devices in a storage architecture which generates a RAID protection over the exposed volumes.

19 Claims, 9 Drawing Sheets

(56) References Cited

U.S. PATENT DOCUMENTS

| | | | |
|---|---|---|---|
| 5,879,459 A | 3/1999 | Gadgil et al. | |
| 5,990,899 A | 11/1999 | Whitten | |
| 6,042,652 A | 3/2000 | Hyun et al. | |
| 6,061,274 A * | 5/2000 | Thibault | G06F 12/0866 365/189.05 |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |
| 6,174,809 B1 | 1/2001 | Kang et al. | |
| 6,203,613 B1 | 3/2001 | Gates et al. | |
| 6,219,753 B1 * | 4/2001 | Richardson | G06F 3/0617 711/114 |
| 6,260,125 B1 | 7/2001 | McDowell | |
| 6,270,572 B1 | 8/2001 | Kim et al. | |
| 6,272,534 B1 | 8/2001 | Guha | |
| 6,287,965 B1 | 9/2001 | Kang et al. | |
| 6,467,023 B1 | 10/2002 | DeKoning et al. | |
| 6,567,890 B1 * | 5/2003 | Mulvey | G06F 11/2007 370/360 |
| 6,571,354 B1 * | 5/2003 | Parks | G06F 11/008 714/6.32 |
| 6,571,355 B1 * | 5/2003 | Linnell | G06F 11/2005 714/4.2 |
| 6,574,657 B1 | 6/2003 | Dickinson | |
| 6,574,687 B1 * | 6/2003 | Teachout | G06F 3/0614 710/38 |
| 6,581,136 B1 * | 6/2003 | Tuccio | G06F 3/061 370/360 |
| 6,598,174 B1 * | 7/2003 | Parks | G06F 11/008 711/162 |
| 6,621,493 B1 | 9/2003 | Whitten | |
| 6,636,934 B1 * | 10/2003 | Linnell | G06F 11/2005 710/100 |
| 6,804,676 B1 | 10/2004 | Bains, II | |
| 6,947,981 B2 | 9/2005 | Lubbers et al. | |
| 7,043,610 B2 | 5/2006 | Horn et al. | |
| 7,051,126 B1 | 5/2006 | Franklin | |
| 7,076,620 B2 | 7/2006 | Takeda et al. | |
| 7,103,716 B1 * | 9/2006 | Nanda | G06F 11/1076 711/114 |
| 7,111,197 B2 | 9/2006 | Kingsbury et al. | |
| 7,117,327 B2 | 10/2006 | Hirakawa et al. | |
| 7,120,768 B2 | 10/2006 | Mizuno et al. | |
| 7,130,975 B2 | 10/2006 | Suishu et al. | |
| 7,139,927 B2 | 11/2006 | Park et al. | |
| 7,159,088 B2 | 1/2007 | Hirakawa et al. | |
| 7,167,963 B2 | 1/2007 | Hirakawa et al. | |
| 7,203,741 B2 | 4/2007 | Marco et al. | |
| 7,222,136 B1 | 5/2007 | Brown et al. | |
| 7,296,008 B2 | 11/2007 | Passerini et al. | |
| 7,308,532 B1 * | 12/2007 | Wood | G06F 11/1076 711/112 |
| 7,328,373 B2 | 2/2008 | Kawamura et al. | |
| 7,353,335 B2 | 4/2008 | Kawamura | |
| 7,360,113 B2 | 4/2008 | Anderson et al. | |
| 7,426,618 B2 | 9/2008 | Vu et al. | |
| 7,516,287 B2 | 4/2009 | Ahal et al. | |
| 7,519,625 B2 | 4/2009 | Honami et al. | |
| 7,519,628 B1 | 4/2009 | Leverett | |
| 7,546,485 B2 | 6/2009 | Cochran et al. | |
| 7,577,867 B2 | 8/2009 | Lewin et al. | |
| 7,590,887 B2 | 9/2009 | Kano | |
| 7,606,940 B2 | 10/2009 | Yamagami | |
| 7,627,612 B2 | 12/2009 | Ahal et al. | |
| 7,627,687 B2 | 12/2009 | Ahal et al. | |
| 7,631,143 B1 * | 12/2009 | Niver | G06F 3/0617 711/114 |
| 7,719,443 B1 | 5/2010 | Natanzon | |
| 7,757,057 B2 | 7/2010 | Sangapu et al. | |
| 7,774,565 B2 | 8/2010 | Lewin et al. | |
| 7,797,358 B1 | 9/2010 | Ahal et al. | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,849,361 B2 | 12/2010 | Ahal et al. | |
| 7,860,836 B1 | 12/2010 | Natanzon et al. | |
| 7,865,677 B1 * | 1/2011 | Duprey | G06F 3/0604 711/162 |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,156,281 B1 * | 4/2012 | Grosner | G06F 3/0607 711/114 |
| 8,205,009 B2 | 6/2012 | Hellen et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,370,648 B1 | 2/2013 | Natanzon | |
| 8,380,885 B1 | 2/2013 | Natanzon | |
| 8,392,680 B1 | 3/2013 | Natanzon et al. | |
| 8,429,362 B1 | 4/2013 | Natanzon et al. | |
| 8,433,869 B1 | 4/2013 | Natanzon et al. | |
| 8,438,135 B1 | 5/2013 | Natanzon et al. | |
| 8,464,101 B1 | 6/2013 | Natanzon et al. | |
| 8,478,955 B1 | 7/2013 | Natanzon et al. | |
| 8,495,304 B1 | 7/2013 | Natanzon et al. | |
| 8,498,417 B1 * | 7/2013 | Harwood | H04L 63/062 380/277 |
| 8,510,279 B1 | 8/2013 | Natanzon et al. | |
| 8,521,691 B1 | 8/2013 | Natanzon | |
| 8,521,694 B1 | 8/2013 | Natanzon | |
| 8,543,609 B1 | 9/2013 | Natanzon | |
| 8,583,885 B1 | 11/2013 | Natanzon | |
| 8,588,425 B1 * | 11/2013 | Harwood | H04L 9/0894 380/278 |
| 8,600,945 B1 | 12/2013 | Natanzon et al. | |
| 8,601,085 B1 | 12/2013 | Ives et al. | |
| 8,627,012 B1 | 1/2014 | Derbeko et al. | |
| 8,683,592 B1 | 3/2014 | Dotan et al. | |
| 8,694,700 B1 | 4/2014 | Natanzon et al. | |
| 8,706,700 B1 | 4/2014 | Natanzon et al. | |
| 8,712,962 B1 | 4/2014 | Natanzon et al. | |
| 8,719,497 B1 | 5/2014 | Don et al. | |
| 8,725,691 B1 | 5/2014 | Natanzon | |
| 8,725,692 B1 | 5/2014 | Natanzon et al. | |
| 8,726,066 B1 | 5/2014 | Natanzon et al. | |
| 8,738,813 B1 | 5/2014 | Natanzon et al. | |
| 8,745,004 B1 | 6/2014 | Natanzon et al. | |
| 8,751,828 B1 | 6/2014 | Raizen et al. | |
| 8,769,336 B1 | 7/2014 | Natanzon et al. | |
| 8,799,681 B1 * | 8/2014 | Linnell | G06F 21/62 380/277 |
| 8,805,786 B1 | 8/2014 | Natanzon | |
| 8,806,161 B1 | 8/2014 | Natanzon | |
| 8,825,848 B1 | 9/2014 | Dotan et al. | |
| 8,832,399 B1 | 9/2014 | Natanzon et al. | |
| 8,850,143 B1 | 9/2014 | Natanzon | |
| 8,850,144 B1 | 9/2014 | Natanzon et al. | |
| 8,862,546 B1 | 10/2014 | Natanzon et al. | |
| 8,892,835 B1 | 11/2014 | Natanzon et al. | |
| 8,898,112 B1 | 11/2014 | Natanzon et al. | |
| 8,898,409 B1 | 11/2014 | Natanzon et al. | |
| 8,898,515 B1 | 11/2014 | Natanzon | |
| 8,898,519 B1 | 11/2014 | Natanzon et al. | |
| 8,914,595 B1 | 12/2014 | Natanzon | |
| 8,924,668 B1 | 12/2014 | Natanzon | |
| 8,930,500 B2 | 1/2015 | Marco et al. | |
| 8,930,947 B1 | 1/2015 | Derbeko et al. | |
| 8,935,498 B1 | 1/2015 | Natanzon | |
| 8,949,180 B1 | 2/2015 | Natanzon et al. | |
| 8,954,673 B1 | 2/2015 | Natanzon et al. | |

(56) References Cited

U.S. PATENT DOCUMENTS

| | | |
|---|---|---|
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,330,156 B2 * | 5/2016 | Satapathy ......... G06F 17/30575 |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | Benhanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 2002/0129168 A1 | 9/2002 | Kanai et al. |
| 2002/0194294 A1 * | 12/2002 | Blumenau ............ G06F 3/0605 709/213 |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0166083 A1 * | 7/2005 | Frey, Jr. ............ G06F 11/1076 714/6.2 |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0112219 A1 * | 5/2006 | Chawla ................ G06F 3/0607 711/114 |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2006/0212462 A1 | 9/2006 | Hellen et al. |
| 2007/0055833 A1 | 3/2007 | Vu et al. |
| 2007/0162513 A1 | 7/2007 | Lewin et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0220311 A1 | 9/2007 | Lewin et al. |
| 2007/0266053 A1 | 11/2007 | Ahal et al. |
| 2008/0082591 A1 | 4/2008 | Ahal et al. |
| 2008/0082592 A1 | 4/2008 | Ahal et al. |
| 2008/0082770 A1 | 4/2008 | Ahal et al. |
| 2009/0276566 A1 * | 11/2009 | Coatney ............. G06F 3/0605 711/114 |
| 2010/0030960 A1 * | 2/2010 | Kamalavannan ... G06F 11/1076 711/114 |
| 2010/0083040 A1 * | 4/2010 | Voigt .................. G06F 11/201 714/6.32 |
| 2011/0191595 A1 * | 8/2011 | Damian ................ H04L 9/06 713/189 |
| 2014/0082128 A1 * | 3/2014 | Beard ................ H04L 29/08549 709/216 |
| 2014/0082129 A1 * | 3/2014 | Beard ................ H04L 67/1097 709/216 |
| 2014/0082288 A1 * | 3/2014 | Beard ................ G06F 17/30132 711/123 |
| 2014/0082295 A1 * | 3/2014 | Beard ................ G06F 12/0891 711/135 |
| 2014/0201425 A1 * | 7/2014 | Clark .................. G06F 3/061 711/103 |
| 2015/0019807 A1 * | 1/2015 | Malkin ................ G06F 3/0644 711/114 |
| 2015/0058291 A1 * | 2/2015 | Earl .................... G06F 17/30144 707/625 |
| 2015/0058298 A1 * | 2/2015 | Earl .................... G06F 11/1425 707/674 |

(56) References Cited

U.S. PATENT DOCUMENTS

| | | | | |
|---|---|---|---|---|
| 2015/0058306 A1* | 2/2015 | Earl | ................... | H04L 67/1097 707/703 |
| 2015/0058475 A1* | 2/2015 | Earl | ..................... | H04L 47/741 709/224 |
| 2015/0058487 A1* | 2/2015 | Karamanolis | ....... | G06F 12/0802 709/226 |
| 2015/0058577 A1* | 2/2015 | Earl | ..................... | G06F 3/0613 711/136 |
| 2015/0058863 A1* | 2/2015 | Karamanolis | ......... | G06F 9/5083 718/105 |

OTHER PUBLICATIONS

Soules, "Metadata Efficiency in Versioning File Systems;" 2003; 16 Pages.
AIX System Management Concepts: Operating Systems and Devices; May 2000; 280 Pages.
Soules et al.; "Metadata Efficiency in a Comprehensive Versioning File System;" May 2002; CMU-CS-02-145; School of Computer Science, Carnegie Mellon University, Pittsburgh, PA 15213; 33 Pages.
Linux Filesystems; Sams Publishing; 2002; 12 Pages.
Bunyan, "Multiplexing in a BrightStor® ARCserve® Backup Release 11;" Mar. 2004; 4 Pages.
Marks, "Network Computing;" Feb. 2, 2006; 8 Pages.
Hill, "Network Computing;" Jun. 8, 2006; 9 Pages.
Microsoft Computer Dictionary; 2002; Press Fifth Edition; 3 Pages.
Retrieved from http://en.wikipedia.org/wiki/DEFLATE; Deflate; Jun. 19, 2008; 6 Pages.
Retrieved from http://en.wikipedia.org/wiki/Huffman_coding; Huffman Coding; Jun. 8, 2008; 11 Pages.
Retrieved from http:///en.wikipedia.org/wiki/LZ77; LZ77 and LZ78; Jun. 17, 2008; 2 Pages.
U.S. Appl. No. 11/609,560 downloaded Feb. 23, 2015; 265 Pages.
U.S. Appl. No. 12/057,652 downloaded Feb. 23, 2015; 296 Pages.
U.S. Appl. No. 11/609,561 downloaded Feb. 23, 2015; 219 Pages.
U.S. Appl. No. 11/356,920 downloaded Feb. 23, 2015; 272 Pages.
U.S. Appl. No. 10/512,687 downloaded Feb. 23, 2015; 300 Pages.
U.S. Appl. No. 10/512,687 downloaded Feb. 23, 2015; 254 Pages.
U.S. Appl. No. 11/536,233 downloaded Feb. 23, 2015; 256 Pages.
U.S. Appl. No. 11/536,215 downloaded Feb. 23, 2015; 172 Pages.
U.S. Appl. No. 11/536,160 downloaded Feb. 23, 2015; 230 Pages.
U.S. Appl. No. 11/964,168 downloaded Feb. 23, 2015; 222 Pages.

* cited by examiner

FORMING A PROTECTION DOMAIN IN A STORAGE ARCHITECTURE

BACKGROUND

As usage of computers and computer related services increases, storage requirements for enterprises and Internet related infrastructure companies are exploding at an unprecedented rate. Enterprise applications, both at the corporate and departmental level, are causing this huge growth in storage requirements. Recent user surveys indicate that the average enterprise has been experiencing a 52% growth rate per year in storage. In addition, over 25% of the enterprises experienced more than 50% growth per year in storage needs, with some enterprises registering as much as 500% growth in storage requirements.

Today, several approaches exist for networked storage, including hardware-based systems. These architectures work well but are generally expensive to acquire, maintain, and manage, thus limiting their use to larger businesses. Small and mid-sized businesses might not have the resources, including money and expertise, to utilize the available scalable storage solutions.

SUMMARY

In one aspect, a method includes generating a plurality of protection domains of software-defined storage, generating a volume in each protection domain and exposing the volumes as devices in a storage architecture which generates a RAID protection over the exposed volumes. In another aspect, an apparatus includes electronic hardware circuitry configured to generate a plurality of protection domains of software-defined storage, generate a volume in each protection domain and expose the volumes as devices in a storage architecture which generates a RAID protection over the exposed volumes. In a further aspect, an article includes a non-transitory computer-readable medium that stores computer-executable instructions. The instructions cause a machine to generate a plurality of protection domains of software-defined storage, generate a volume in each protection domain and expose the volumes as devices in a storage architecture which generates a RAID protection over the exposed volumes.

DETAILED DESCRIPTION

Described herein are techniques to form a protection domain in a storage architecture.

Figure 1A:
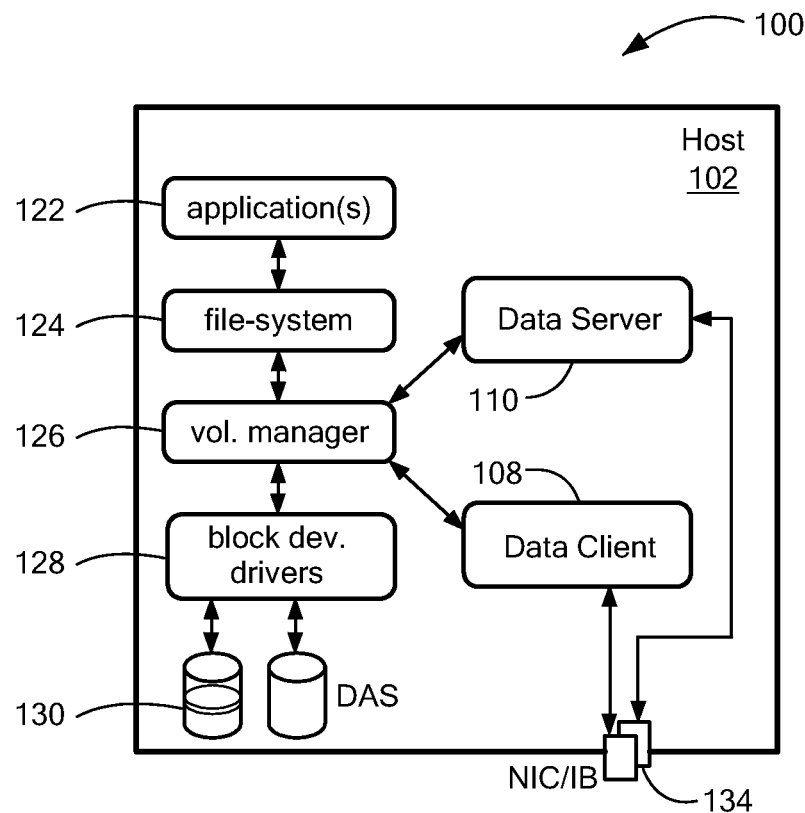
FIG. 1A is a block diagram of an example of a system to manage a distributed storage space.

Referring to FIG. 1, a system 100 to manage a distributed storage space includes a host 102. The host 102 includes a data client 108, a data server 110, application(s) 122, a file system 124, a volume manager 126, block device driver 128 and a network interface card (NIC) 134. Communications between the application(s) 122 and the file system 124 use file-system semantics.

Communications between the file system 124, the volume manager 126, the volume manager 126, the block device drivers 128, the DAS 130 and the HBAs 132 use block semantics. The data client 108 is a block device driver that exposes shared block volumes to the application 122. The data client 108 serves the I/O request of the resident host applications 122. The data server 110 is a daemon/service that owns local storage (e.g., DAS 130) that contributes to the storage pool. The data server 110 serves the I/O requests of various data clients 108.

Figure 1B:
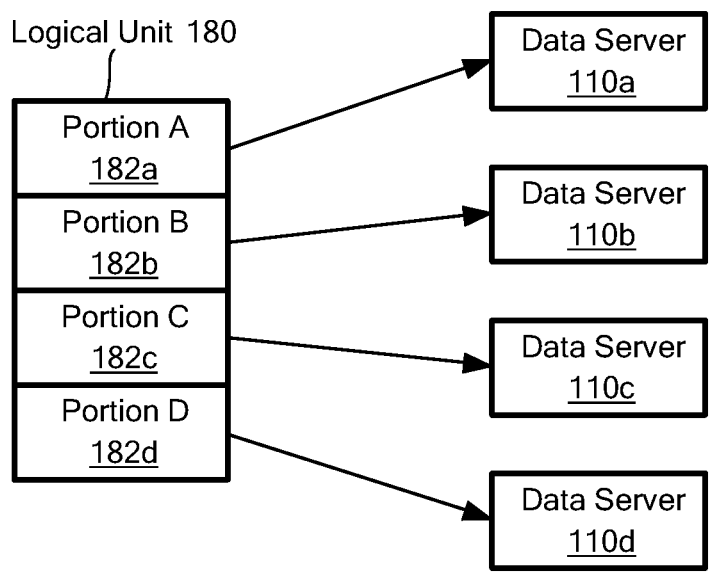
FIG. 1B is a block diagram of a relationship between a logical unit and data servers.

Referring to FIG. 1B, a software-defined storage layer can expose logical units (LUs) or devices, where each device is spread across all the storage devices in all the storage servers in the relevant protection domain. For example, each data server 110a-110d is responsible for handling a portion of a logical unit 180. For example, a portion A 182a of the logical unit 180 is handled by the data server 110a, a portion B 182b of the logical unit 180 is handled by the data server 110b, a portion C 182c of the logical unit 180 is handled by the data server 110c and a portion D 182d of the logical unit 180 is handled by the data server 110d. A portion of the logical unit includes one or more data blocks. In one example, a data block may be 4 kb or 8 kb. In another example, a data block is any size designated by a user. Each data server 110a-110d is responsible for writing data in their respective portion 182a-182d of the logical unit 180 to their respective block storage device.

Figure 1C:
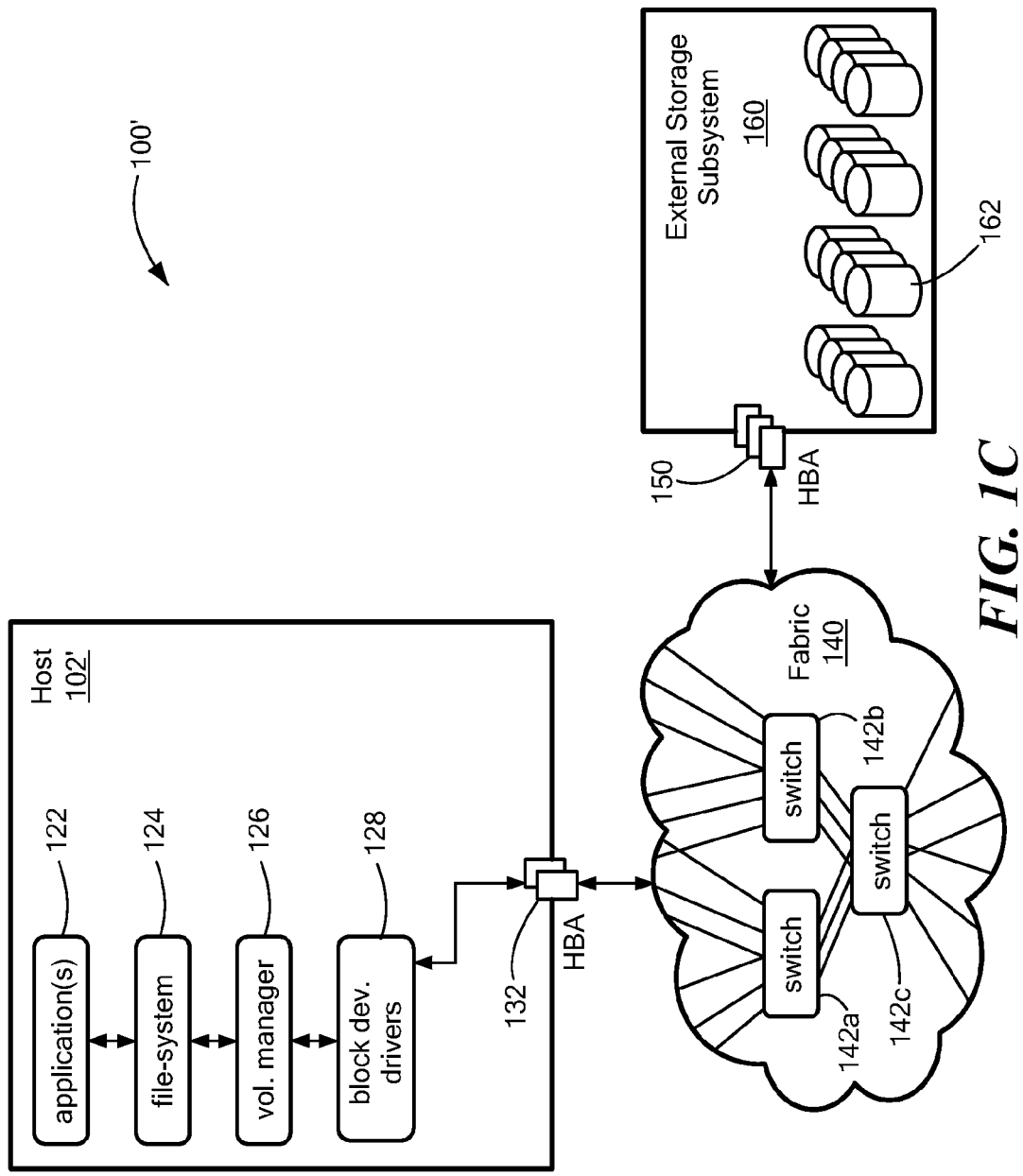
FIG. 1C is a block diagram of a system with a host and storage network.

Referring to FIG. 1C, a system 100' includes a host 102', connected to an external storage subsystem 160 of disks 162 by a fabric 140. The fabric 140 is connected to the external storage subsystem 160 through host bus adapters (HBAs) 150. The fabric 140 includes switches (e.g., switches 142a-142c). The host 102' includes application(s) 122, a file system 124, a volume manager 126, block device driver 128, and host bus adapters (HBAs) 132 to communicate to the fabric 140.

As will be further described herein the systems 100, 100' represent storage architectures that may be used in protection domains.

Figure 2:
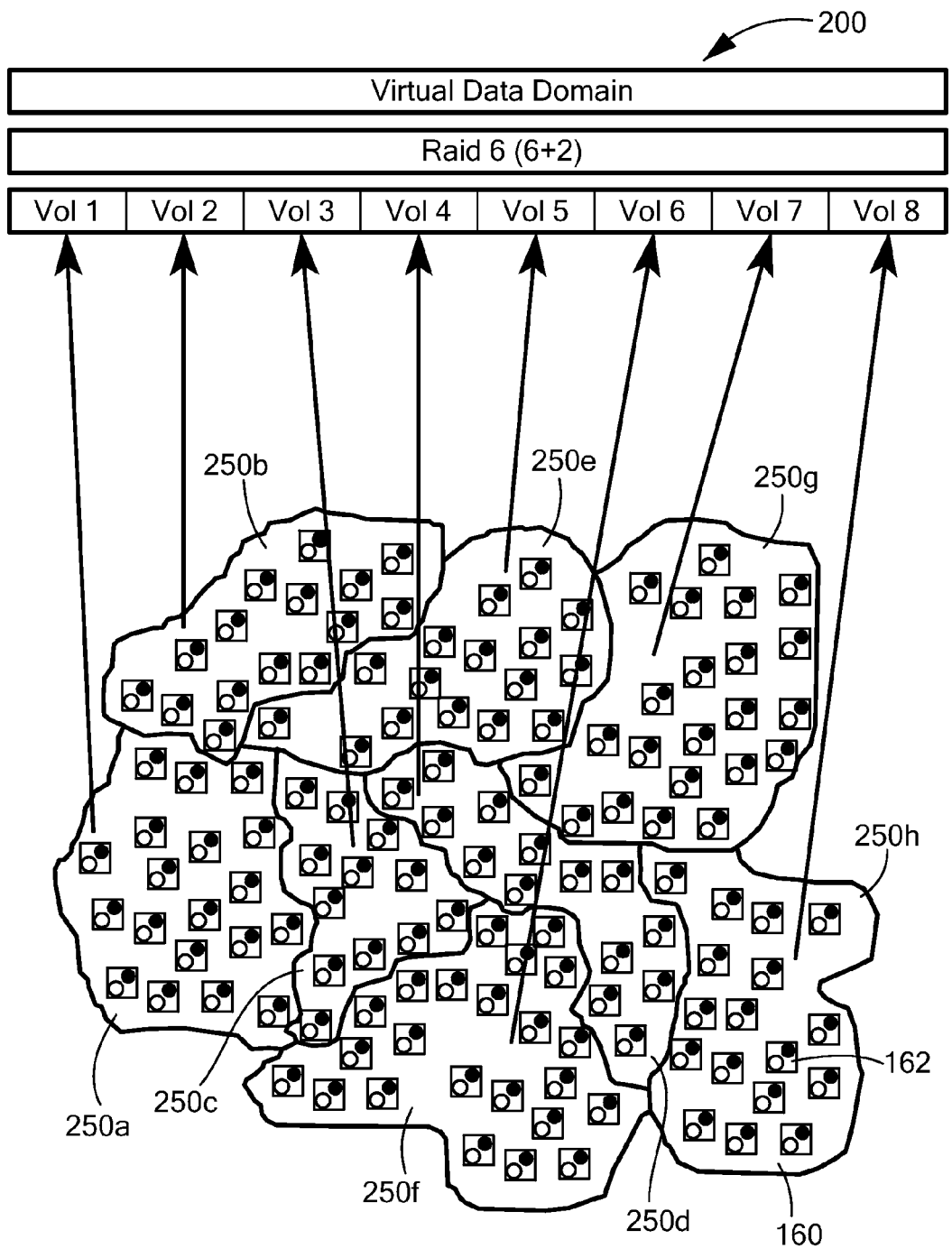
FIG. 2 is a block diagram of an example of a virtual data domain using a distributed storage system.

Referring to FIG. 2, an example of scale out architecture is a scale out architecture 200. The architecture 200 includes a scale out storage system with protection domains (e.g., EMC® SCALEIO®) with a data domain virtual appliance installed over it. A protection domain is a virtual storage array (volumes) formed on a set of storage devices. Each protection domain has its own failure model and failure of one protection domain will not cause failure in another protection domain. In this embodiment the protection domains do not mirror the I/Os, so that a failure of one node or one disk will cause the loss of a complete protection domain (typically in a software defined storage all devices are mirrored so a failure of a single device does not imply loss of access to the storage in this case the devices are not mirrored).

In the example in FIG. 2, there are eight protection domains (250a-250h) formed over storage devices (e.g., a set of the storage devices 160 such the device 162). A volume from each protection domain is configured. For example, the protection domain 250a exposes volume 1, the protection domain 250b exposes a volume 2, the protection domain 250c exposes volume 3, . . . , the protection domain 250h exposes volume 8. A data domain virtual appliance is configured to consume the 8 virtual volumes and treat each volume as a separate disk drive (and also the volumes are striped across multiple devices).

The data domain instance uses RAID 6 over the volumes. In the example in FIG. 2, RAID 6 is formed over eight volumes (6+2). Thus, in such a deployment there is double protection (due to the RAID 6 using less storage, i.e., with no mirroring availability is achieved by the RAID at an upper storage layer.

If a regular deployment of the scale out architecture (e.g., EMC® SCALEIO® version) is used (i.e., each protection domain also has mirroring between its volumes), the system 300 will protect against up to five failures. The configuration in FIG. 2 is deployable in a hyper-converged infrastructure, where the amount of nodes and devices is relatively large.

Multiple data domain instances can be deployed on the same set of protection domains, thus giving multi tenancy and scale out architecture. If a single namespace file system is implemented in the data domain, then this architecture can be used for a single huge scale data domain system.

Figure 3:
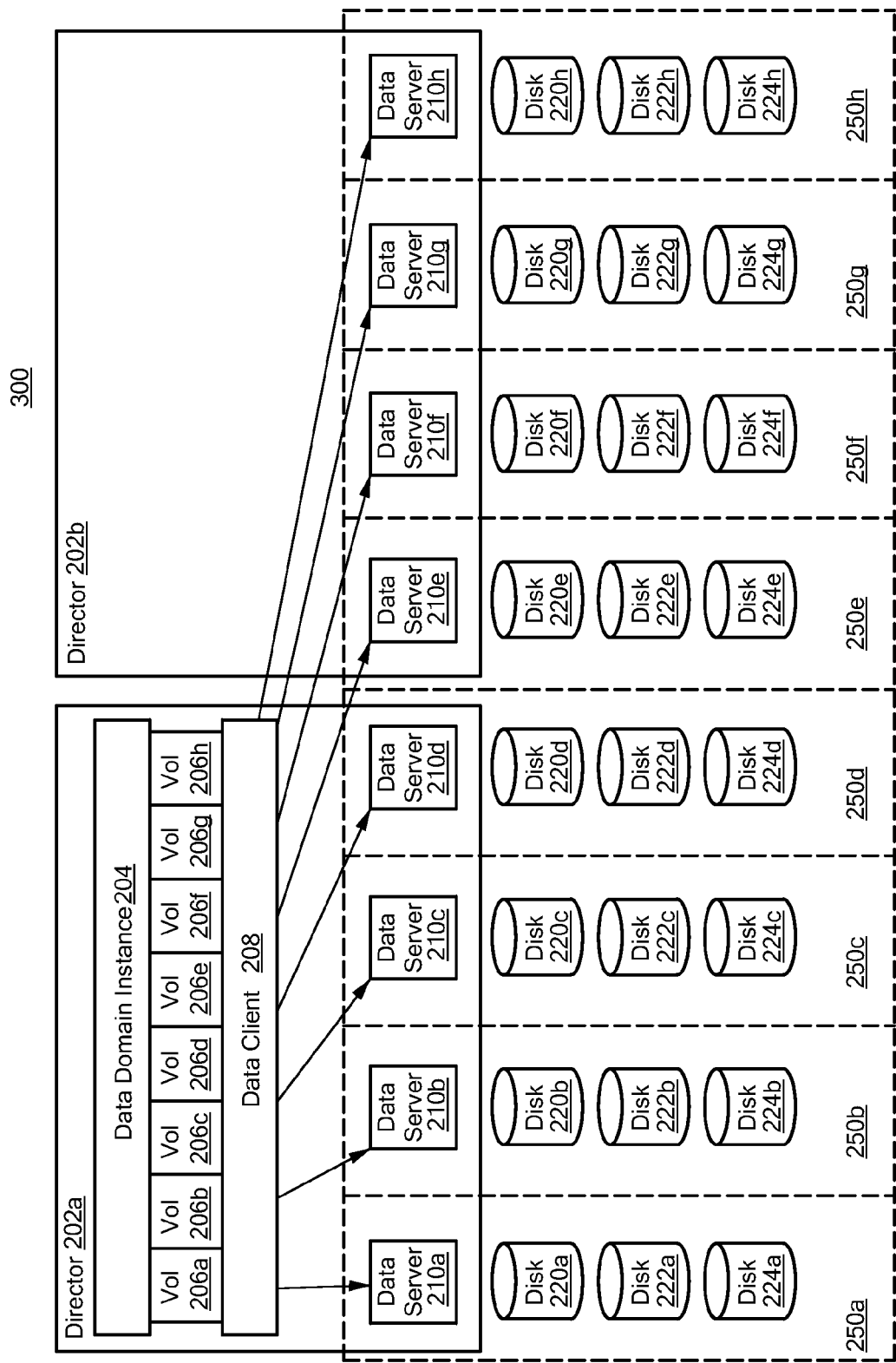
FIG. 3 is a block diagram of an example of first configuration of the virtual data domain.

Referring to FIG. 3, a first configuration 300 of the scale out architecture 200 includes a director 202a, a director 202b and storage disks (e.g., storage disks 220a-220h, 222a-222h, 224a-224h), which are dual ported (i.e., both directors 202a, 202b can access the storage devices). The director 202a includes a data domain instance 204 (e.g., using Raid 6+2) over volumes 206a-206h, a data client 208 and data servers 210a-210d. The director 202b includes data servers 210e-210h. In this configuration, a protection domain 250a is formed for the volume 206a and includes data server 210a and devices 220a, 222a, 224a; a protection domain 250b is formed for the volume 206b and includes data server 210b and devices 220b, 222b, 224b; . . . , and a protection domain 250h is formed for the volume 206h and includes data server 210h and devices 220h, 222h, 224h.

Figure 4:
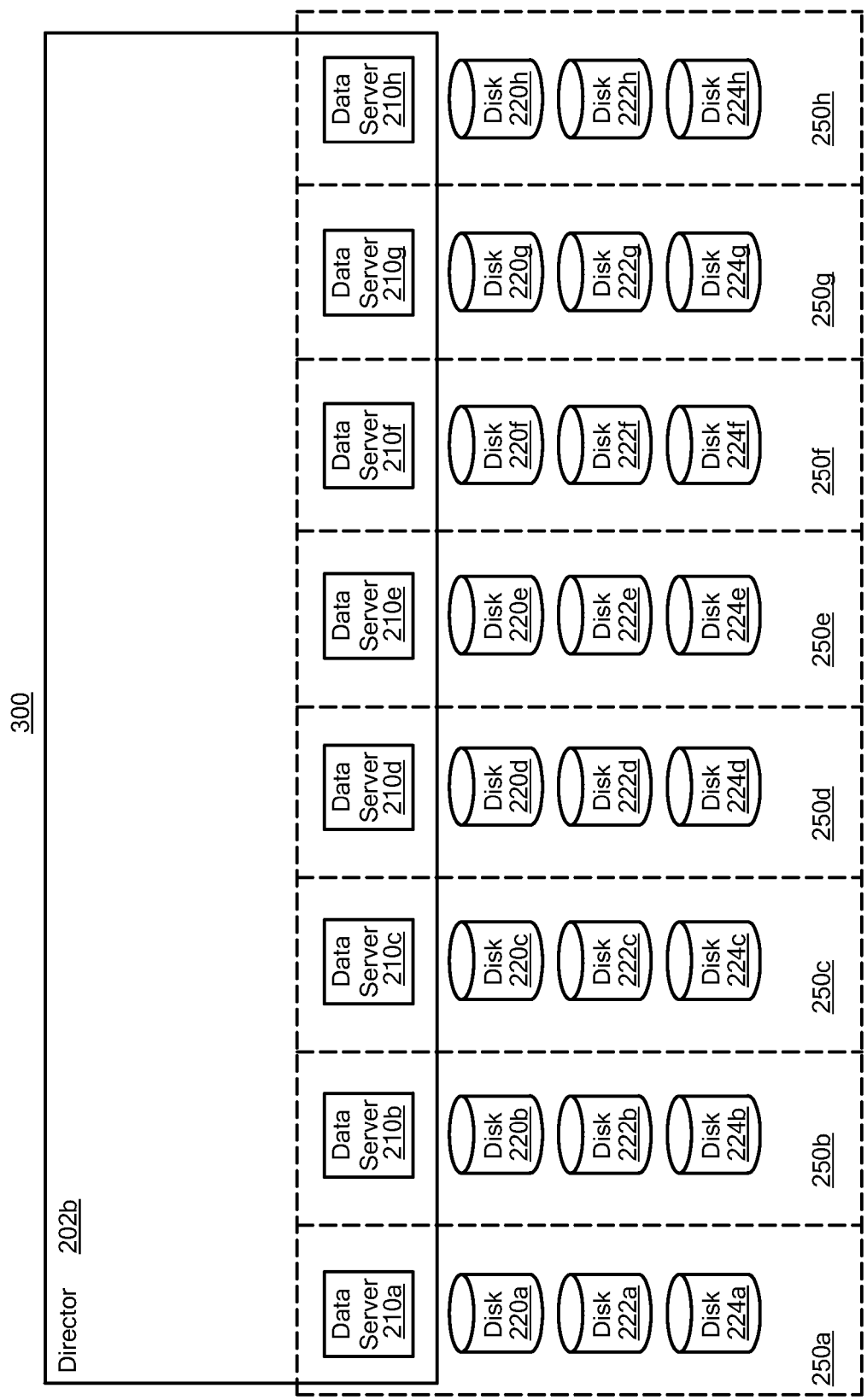
FIG. 4 is a block diagram of an example of the first configuration of the virtual data domain after failure of a director.

Referring to FIG. 4, in the configuration 300, if one of the directors fails the data servers will immediately start running on the second director, since the disks are dual ported the access to the disks is not lost. For example, as shown on FIG. 4, the director 202a has failed and the data servers 210a-210e start running on the director 202b and thus the virtual data domain can continue to run on the second director.

Figure 5:
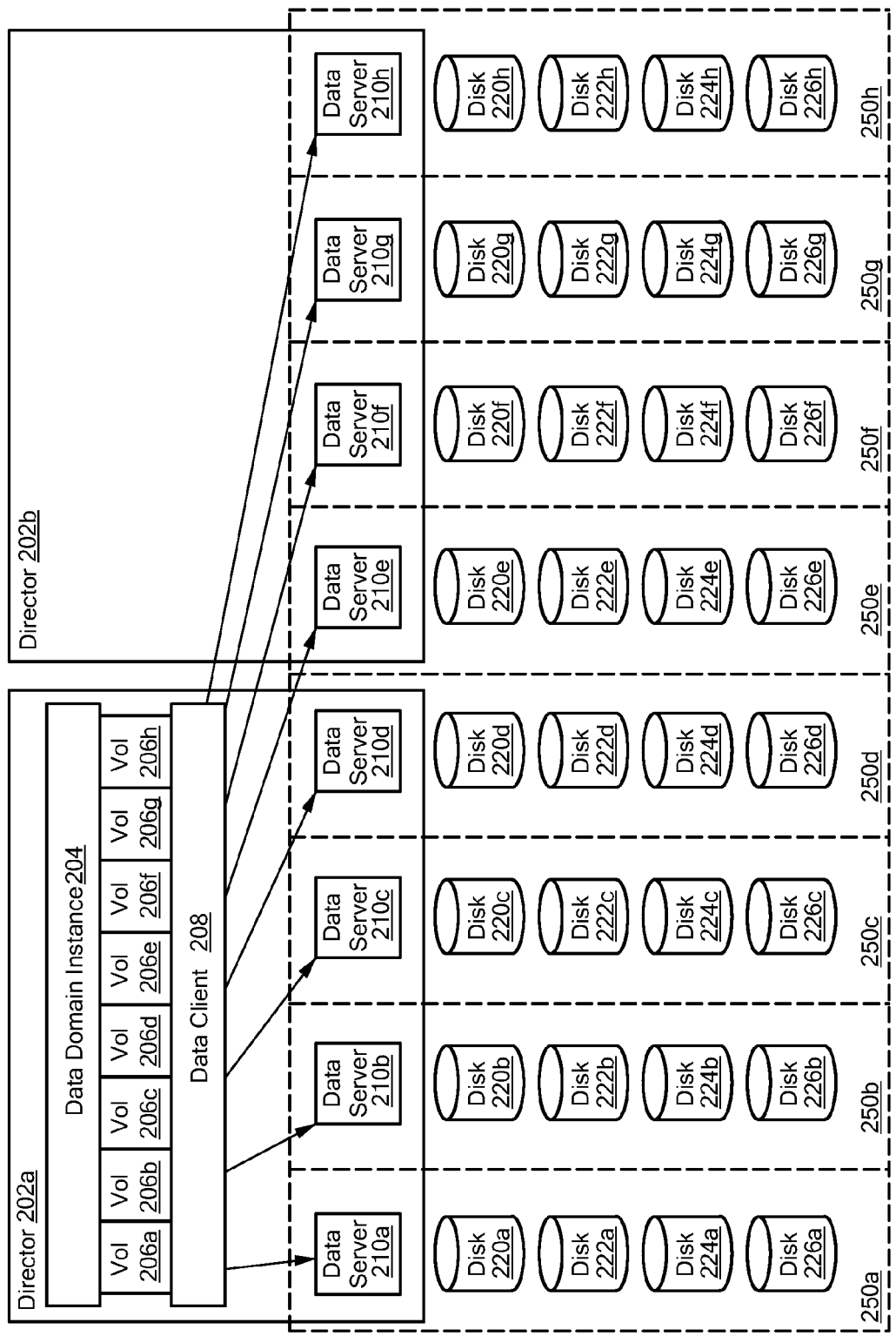
FIG. 5 is a block diagram of an example of the first configuration of the virtual data domain with additional disks added.

Referring to FIG. 5, in the configuration 300, adding more devices may be done by adding a disk in each protection domain and data is automatically re-spread over all the devices. The re-spreading of the data is done by the scale out architecture (e.g., EMC® SCALEIO®) software-defined storage and there is no awareness of the process at the layer of the data domain. For example, each of disks 226a-226h are added to a respective domain 250a-250a. For example, disk 226a is added to the protection domain 250a, disk 226b is added to the protection domain 250b, . . . , and disk 226h is added to the protection domain 250h.

Figure 6A:
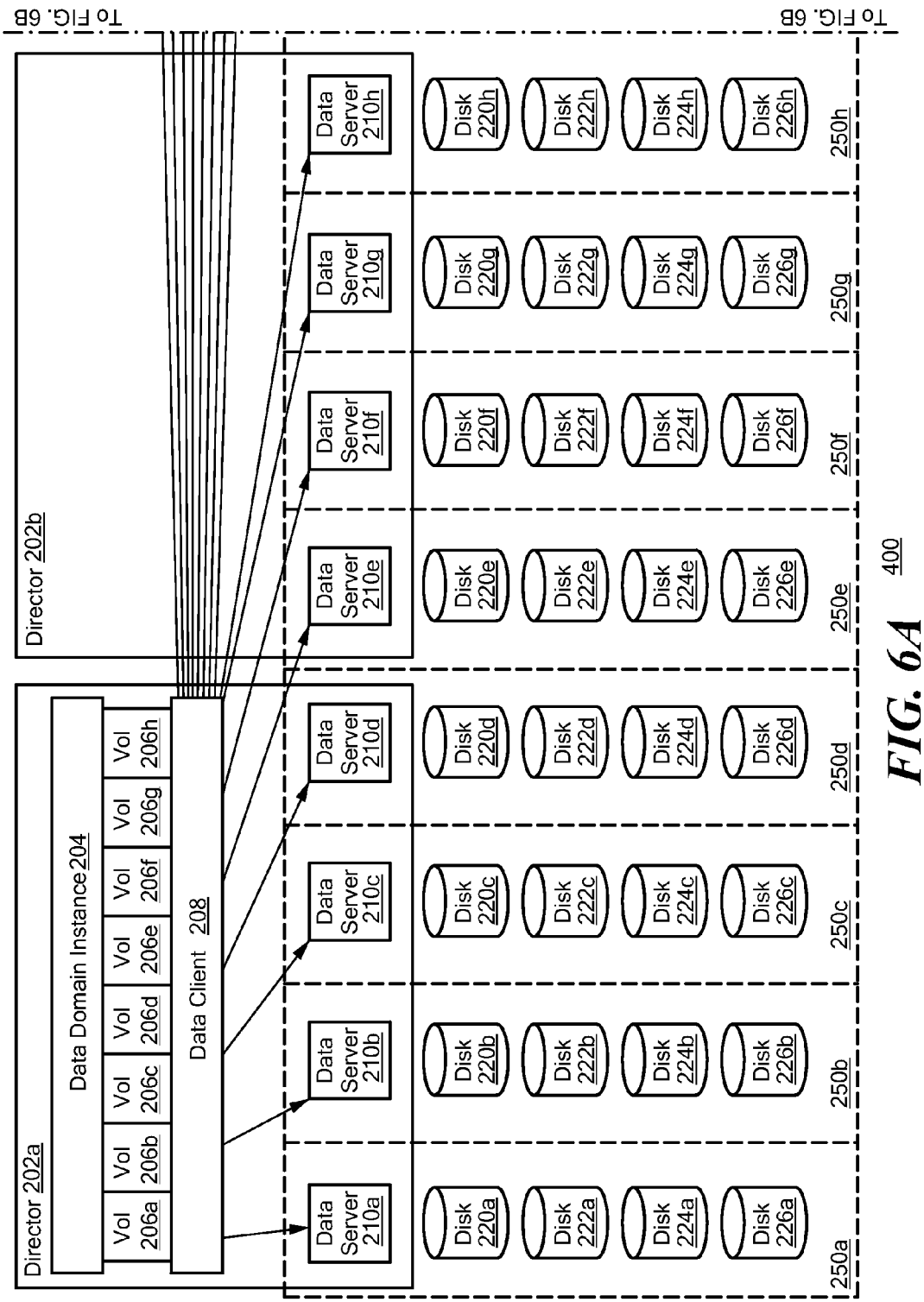
FIGS. 6A and 6B are a block diagram of an example of a second configuration of the virtual data domain.
Figure 6B:
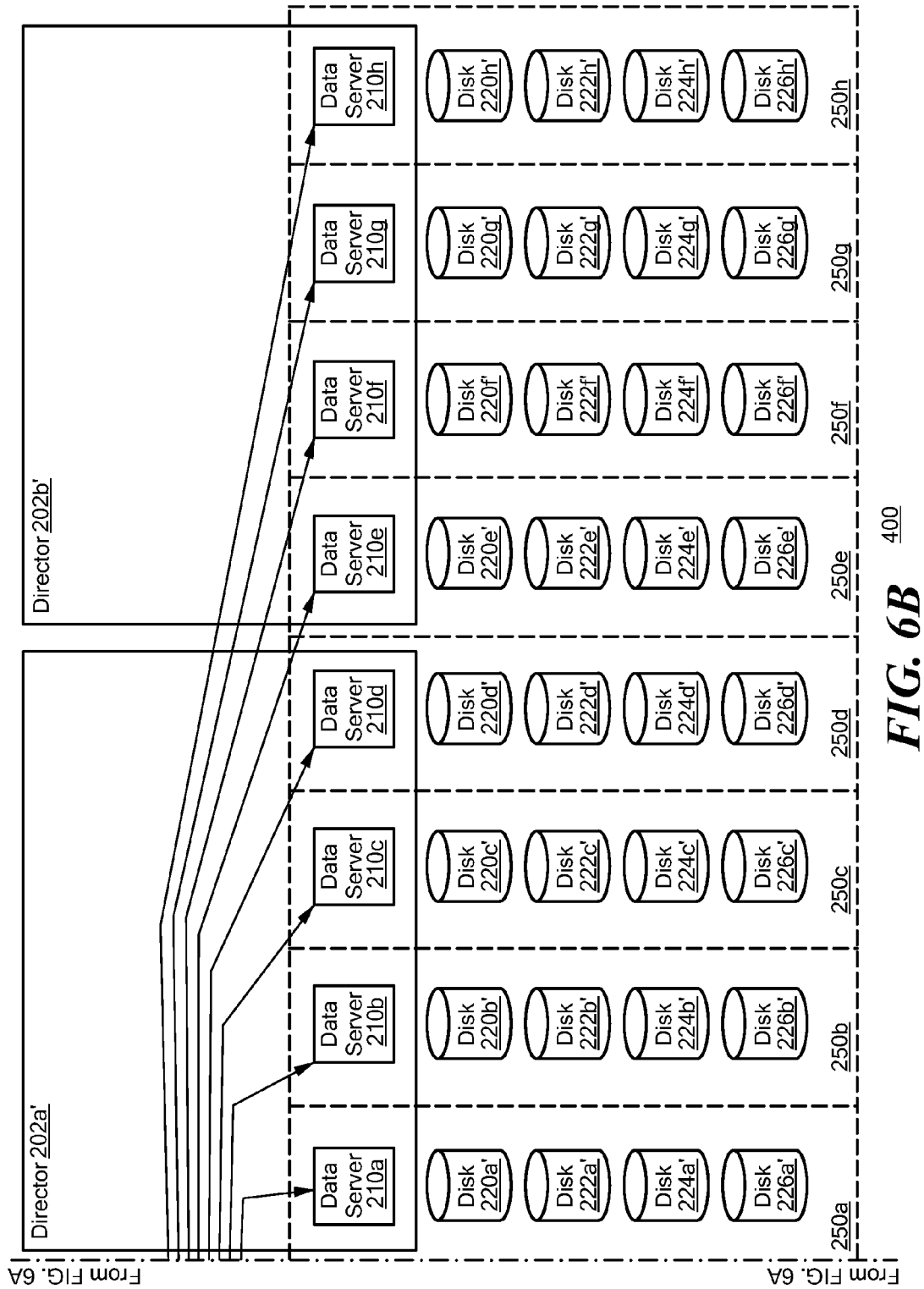

Referring to FIGS. 6A and 6B, the architecture 300 can also be scaled out by adding more directors. For example, in an architecture 400, directors 202a', 202b' are added. The director 202a' is similar as director 202a and the director 202b' is the similar as director 202b. That is, director 202a' includes data server 210a-210d for protection domains 250a-250d but over new devices 222a'-222d', 224a'-224d', 226a'-226d' and director 202b' includes data server 210e-210h for protection domains 250e-250h but over new devices 222e'-222h', 224e'-224h', 226e'-226h'. That is, the data is automatically spread by the software-defined storage layer across the new devices added to each protection domain. The data domain layer is not aware of this process. Multiple instances of data domain can run, for example. An instance or more of a data domain can run on each director. Each instance may use different LUs or volumes exposed by the same eight protection domains 250a-250h.

Figure 7:
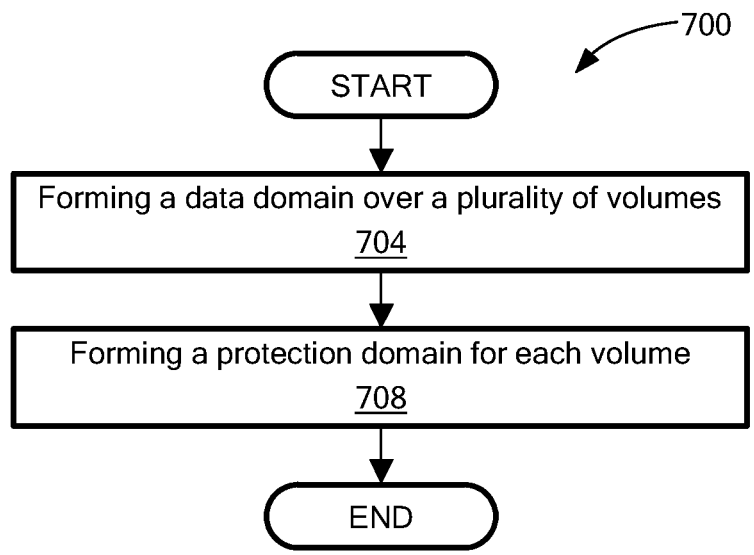
FIG. 7 is a flowchart of an example of a process to form a scale out architecture.

Referring to FIG. 7, a process 700 is an example of a process to form a scale out architecture, for example, as shown in FIGS. 2 to 6. Process 700 forms a data domain over a plurality of volumes using RAID protection (704) and forms a protection domain for each volume (708). Each protection domain includes a data server and a plurality of disks and there is an equal number of disks in each data protection domain.

Figure 8:
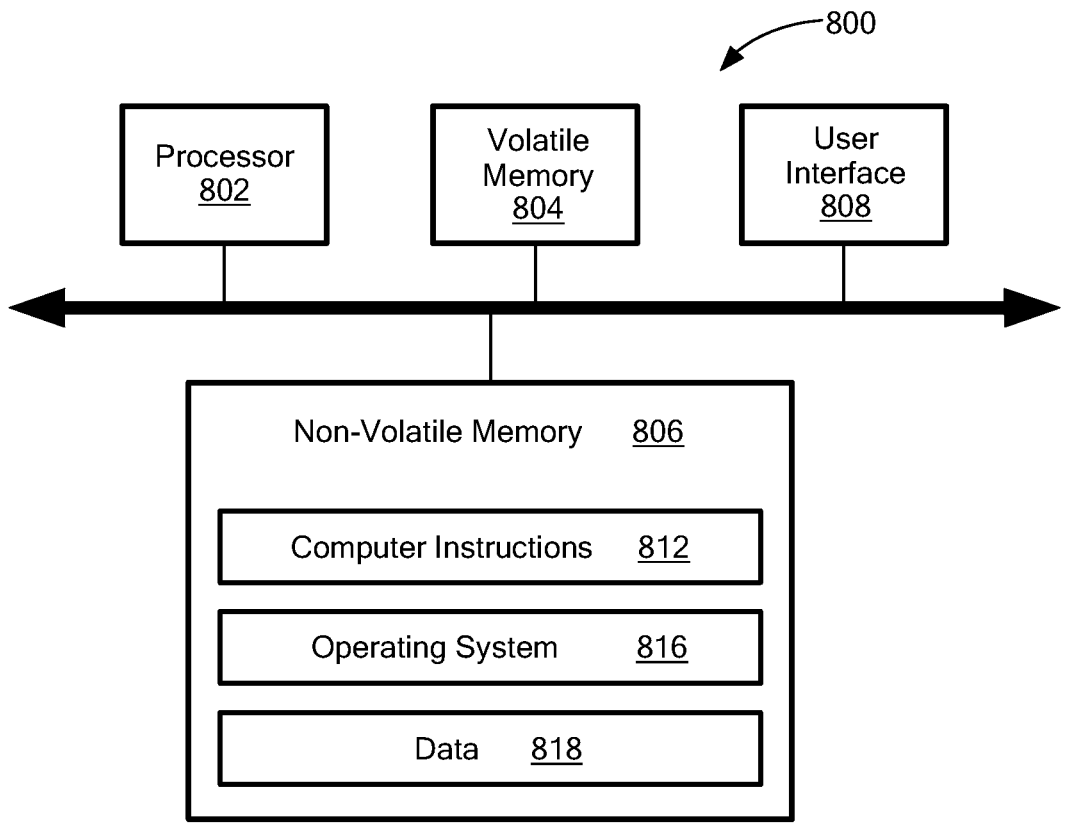
FIG. 8 is a computer on which any of the processes of FIG. 7 may be implemented.

Referring to FIG. 8, in one example, a computer 800 includes a processor 802, a volatile memory 804, a non-volatile memory 806 (e.g., hard disk) and the user interface (UI) 808 (e.g., a graphical user interface, a mouse, a keyboard, a display, touch screen and so forth). The non-volatile memory 806 stores computer instructions 812, an operating system 816 and data 818. In one example, the computer instructions 812 are executed by the processor 802 out of volatile memory 804 to perform all or part of the processes described herein (e.g., process 700).

The processes described herein (e.g., process 700) are not limited to use with the hardware and software of FIG. 8; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 700 is not limited to the specific processing order of FIG. 7. Rather, any of the processing blocks of FIG. 7 may be re-ordered, combined or removed, performed in parallel or in serial, as necessary, to achieve the results set forth above.

The processing blocks (for example, in the process 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
generating a plurality of protection domains of software-defined storage, each protection domain comprising a plurality of storage disks having a first port and a second port, each protection domain having an equal number of storage disks;
connecting a first director to the first port of each storage disk;
connecting a second director to the second port of each storage disk;
running a first plurality of data servers on the first director;
running a second plurality of data servers on the second director, each one of the first and second plurality of data servers assigned to a respective one protection domain;
for each protection domain, generating, on the first director, a virtual volume assigned to the respective protection domain; and
exposing each virtual volume as a separate disk drive in a storage architecture which generates, on the first director, a RAID protection over the exposed virtual volumes as a data domain instance, wherein the exposed virtual volumes are protected together under the same RAID protection level;
running the first plurality of data servers on the second director in response to a failure of the first director; and
running the data domain instance on the second director in response to the failure.

2. The method of claim 1, further comprising adding storage disks by adding an equal number of storage disks to each data protection domain,
wherein data is spread over the storage disks.

3. The method of claim 1, further comprising removing storage disks by removing an equal number of storage disks from each data protection domain,
wherein data is spread over the storage disks.

4. The method of claim 1, wherein the software-defined storage is mirroring data.

5. The method of claim 1, wherein the software-defined storage is not mirroring data and availability is achieved by the RAID at an upper storage layer.

6. An apparatus, comprising:
electronic hardware circuitry configured to:
generate a plurality of protection domains of software-defined storage, each protection domain comprising a plurality of storage disks having a first port and a second port, each protection domain having an equal number of storage disks;
connect a first director to the first port of each storage disk;
connect a second director to the second port of each storage disk;
run a first plurality of data servers on the first director;
run a second plurality of data servers on the second director, each one of the first and second plurality of data servers assigned to a respective one protection domain;
for each protection domain, generate, on the first director, a virtual volume assigned to the respective protection domain; and
expose each virtual volume as a separate disk drive in a storage architecture which generates, on the first director, a RAID protection over the exposed virtual volumes as a data domain instance, wherein the exposed virtual volumes are protected together under the same RAID protection level;
run the first plurality of data servers on the second director in response to a failure of the first director; and
run the data domain instance on the second director in response to the failure.

7. The apparatus of claim 6, wherein the circuitry comprises at least one of a processor, a memory, a programmable logic device or a logic gate.

8. The apparatus of claim 7, further comprising circuitry configured to add an equal number of storage disks to each data protection domain,
wherein data is spread over the storage disks.

9. The apparatus of claim 7, further comprising circuitry configured to remove storage disks by removing an equal number of storage disks from each data protection domain,
wherein data is spread over the storage disks.

10. The apparatus of claim 6, wherein the software-defined storage is mirroring data.

11. The apparatus of claim 6, wherein the software-defined storage is not mirroring data and availability is achieved by the RAID at an upper storage layer.

12. An article comprising:
a non-transitory computer-readable medium that stores computer-executable instructions, the instructions causing a machine to:
generate a plurality of protection domains of software-defined storage, each protection domain comprising a plurality of storage disks having a first port and a second port, each protection domain having an equal number of storage disks;
connect a first director to the first port of each storage disk;
connect a second director to the second port of each storage disk;
run a first plurality of data servers on the first director;
run a second plurality of data servers on the second director, each one of the first and second plurality of data servers assigned to a respective one protection domain;
for each protection domain, generate, on the first director, a virtual volume assigned to the respective protection domain; and
expose each virtual volume as a separate disk drive in a storage architecture which generates, on the first director, a RAID protection over the exposed virtual volumes as a data domain instance, wherein the exposed virtual volumes are protected together under the same RAID protection level;
run the first plurality of data servers on the second director in response to a failure of the first director; and
run the data domain instance on the second director in response to the failure.

13. The article of claim 12, further comprising instructions causing the machine to add an equal number of storage disks to each data protection domain,
wherein data is spread over the storage disks.

14. The article of claim 12, further comprising instructions causing the machine to remove storage disks by removing an equal number of storage disks from each data protection domain,
wherein data is spread over the storage disks.

15. The article of claim 12, wherein the software-defined storage is mirroring data.

16. The article of claim 12, wherein the software-defined storage is not mirroring data and availability is achieved by the RAID at an upper storage layer.

17. The method of claim 1, wherein the exposed volumes are striped across multiple storage devices within a respective domain.

18. The apparatus of claim 6, wherein the exposed volumes are striped across multiple storage devices within a respective domain.

19. The article of claim 12, wherein the exposed volumes are striped across multiple storage devices within a respective domain.

* * * * *